United States Patent [19]

Broyles

[11] Patent Number: 4,511,162
[45] Date of Patent: Apr. 16, 1985

[54] LEAK INDICATING CONDUIT

[75] Inventor: Robert K. Broyles, Pine Valley, Calif.

[73] Assignee: Pathway Bellows, Inc., El Cajon, Calif.

[21] Appl. No.: 463,262

[22] Filed: Feb. 2, 1983

[51] Int. Cl.³ .............................................. F16L 35/00
[52] U.S. Cl. ..................................... 285/93; 285/226; 285/299
[58] Field of Search ................. 285/93, 226, 224, 133, 285/299

[56] References Cited

U.S. PATENT DOCUMENTS

| 3,183,022 | 5/1965 | Sayag | 285/93 |
| 3,232,640 | 2/1966 | Donkle | 285/93 |
| 3,299,417 | 1/1967 | Sibthorpe | 285/93 X |
| 3,472,062 | 10/1969 | Owen | 285/93 X |
| 3,655,224 | 4/1972 | Carberry et al. | 285/93 |
| 3,831,498 | 8/1974 | Harrington | 285/93 X |

FOREIGN PATENT DOCUMENTS

| 2358848 | 5/1974 | Fed. Rep. of Germany | 285/93 |
| 3149553 | 1/1983 | Fed. Rep. of Germany | 285/93 |

*Primary Examiner*—Richard J. Scanlan, Jr.
*Attorney, Agent, or Firm*—Lane, Aitken & Kananen

[57] ABSTRACT

A leak indicating conduit for conveying fluid includes an inner tube and an outer tube, in which the inner tube is separated from the outer tube by a space maintained at a pressure having a predetermined value from the range of values less than the pressure of the conveyed fluid and the ambient pressure, and greater than the pressure of the conveyed fluid and the ambient pressure. A leak indicating device is in continuous communication with the space for indicating a change of pressure in the space from the predetermined value. The indicating device includes a chamber in which an expansible bellows is mounted in communication with the space. The expansible bellows includes a movable plate supporting an indicating element for movement between a concealed first position, thereby indicating no change of pressure from the predetermined value, and a second, visible position, thereby indicating a change of pressure. An electrical switch for operating a separate indicating or control device can be mounted adjacent the expansible bellows, so that it is operated by the bellows as the bellows moves between its first and second positions. Where the leak indicating conduit is used as an expansion joint, the ends of the inner and outer tubes are secured to the pipes by annular attachment welds. Tapered rings are welded over the attachment welds and an aperture is defined in the outer tube, under the tapered rings for detecting leaks in the attachment welds.

16 Claims, 5 Drawing Figures

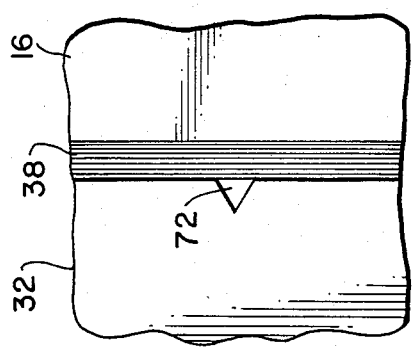
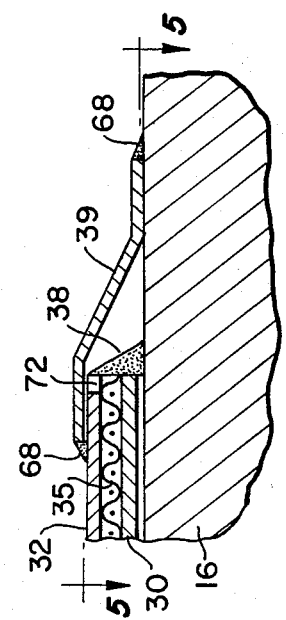
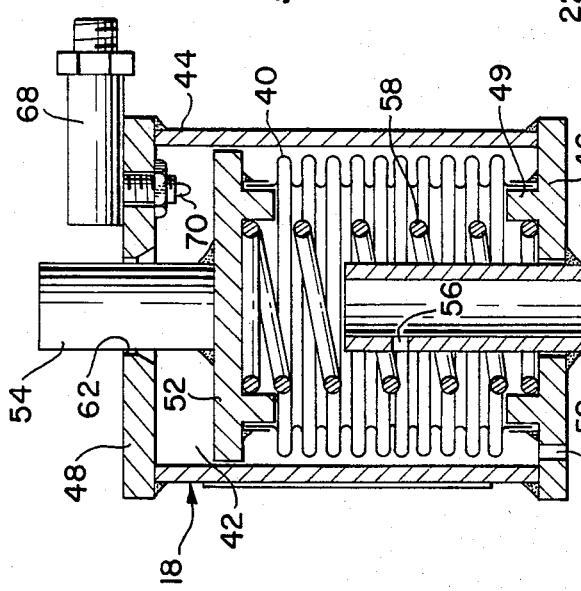
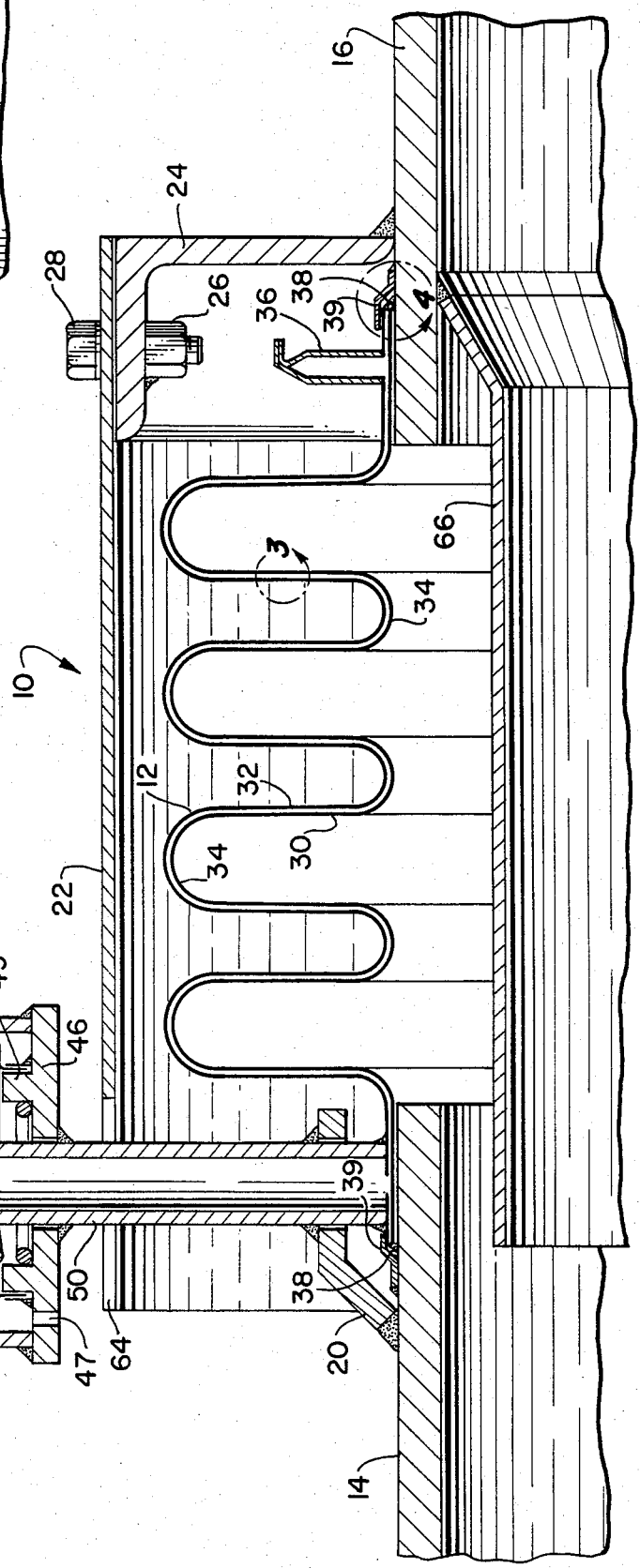

LEAK INDICATING CONDUIT

BACKGROUND OF THE INVENTION

This invention relates to conduits which indicate if a leak is present therein and more particularly to leak indicating flexible bellows used as expansion joints.

It is known to connect the adjacent ends of aligned pipes by means of a flexible bellows to accommodate the expansion and contraction of the pipes at the joint. Such joints are typically formed of a corrugated composite metal conduit comprising an inner tube and a coaxial outer tube spaced from the inner tube. In order that the metal conduit may be flexible, the inner and outer tubes are necessarily relatively thin. Since the fluids carried by the pipes may be toxic or explosive, and may be valuable as well, it is important to be able to detect a leak in the expansion joint and to detect the possibility of a joint failure before it occurs.

Some conduits designed to indicate the presence of leaks are currently known. For example, U.S. Pat. No. 3,183,022 to Sayag discloses a two-ply expansion joint in which the space between the plies is sealed off. A coupling is provided in communication with the space so that a device which is capable of detecting the flow of fluid within the joint may be connected thereto. Thus, the detecting device can periodically be hooked up to the coupling to check for leaks in the inner ply of the expansion joint.

U.S. Pat. No. 3,232,640 to Donkle discloses a two-ply corrugated expansion joint in which a space between the plies is filled with a fluid exerting superatmospheric pressure or is evacuated. A connector is provided in communication with the space so that a leak detecting apparatus can be attached thereto to check for leaks in the inner ply and the outer ply.

U.S. Pat. No. 3,299,417 to Sibthorpe discloses a flexible tube having an inner ply and an outer ply with a space between the plies. An expansible bellows is mounted in communication with the space and an indicating button is supported on the bellows below a horizontal panel. The space is evacuated so that the bellows and the button are maintained in a lower position in which the indicating button is concealed. A spring biases the button into the concealed position. Thus, if a break occurs in the inner ply, the pressure of the fluid being conveyed through the flexible tube will enter the space between the inner and outer plies and flow into the expansible bellows to force the button up against the bias of the spring into a visible position, thereby giving an indication of a leak in the inner ply. The indicating button may be arranged to operate an electrical switch to provide an additional signal, supplementing the signal which is provided by the movement of the button itself.

Although the foregoing patents represent improvements in the art of flexible conduits, the prior art fails to provide a leak indicating conduit which includes a mechanism for continuously monitoring both the inner ply and the outer ply for a leak and for giving an immediate leak signal in response to a leak in either the inner ply or the outer ply. In addition, where the flexible conduit is employed as an expansion joint between two pipes, the prior art fails to provide an arrangement for indicating leaks at the connections between the flexible conduits and the pipes.

SUMMARY OF THE INVENTION

It is, therefore, an object of the present invention to provide a leak indicating conduit, comprising an inner tube and an outer tube and a space between the tubes, which continuously monitors both tubes for leaks and provides an immediate indication of a leak in either tube.

It is another object of the present invention to provide an expansion joint for pipes comprising a leak indicating conduit of the above type, wherein structure is included to indicate a leak at the connections between the leak indicating conduit and the pipes.

In order to fulfill these and other objects, the leak detecting conduit according to the present invention includes an inner tube and an outer tube coaxial with and spaced from the inner tube. The space between the tubes is sealed and placed under a pressure which is either less than or greater than both the pressure of the fluid in the conduit and the ambient pressure. A leak indicating device is in fluid communication with the space and includes an expansible bellows having a movable portion on which an indicating element is mounted. The expansible bellows is contained in a chamber so that the indicating element is movable between a first, concealed position within the chamber, which indicates no change of pressure in the space, and a second position projecting from the chamber, which indicates a change of pressure in the space.

In use as an expansion joint, the leak detecting conduit according to the present invention is secured at its ends to the adjacent ends of aligned pipes, and the indicating device is supported on one of the pipes. The securing is accomplished by annular attachment welds at the ends of the tubes which both seal the space between the tubes and connect the tubes to the pipes. Tapered rings are welded over the attachment welds and openings are defined in the outer tube, under the tapered rings in order to place the outside of the attachment welds in communication with the space, whereby leaks through the attachment welds from between the pipe and the inner tube are indicated by the indicating device.

BRIEF DESCRIPTION OF THE DRAWINGS

FIG. 2 is a partial cross-sectional view of the leak indicating conduit of FIG. 1;

FIG. 4 is an enlarged cross-sectional view of the leak indicating structure at the attachment welds of FIG. 2; and FIG. 5 is a cross section taken along the line 5—5 of FIG. 4.

DETAILED DESCRIPTION OF THE PREFERRED EMBODIMENT

Figure 1:
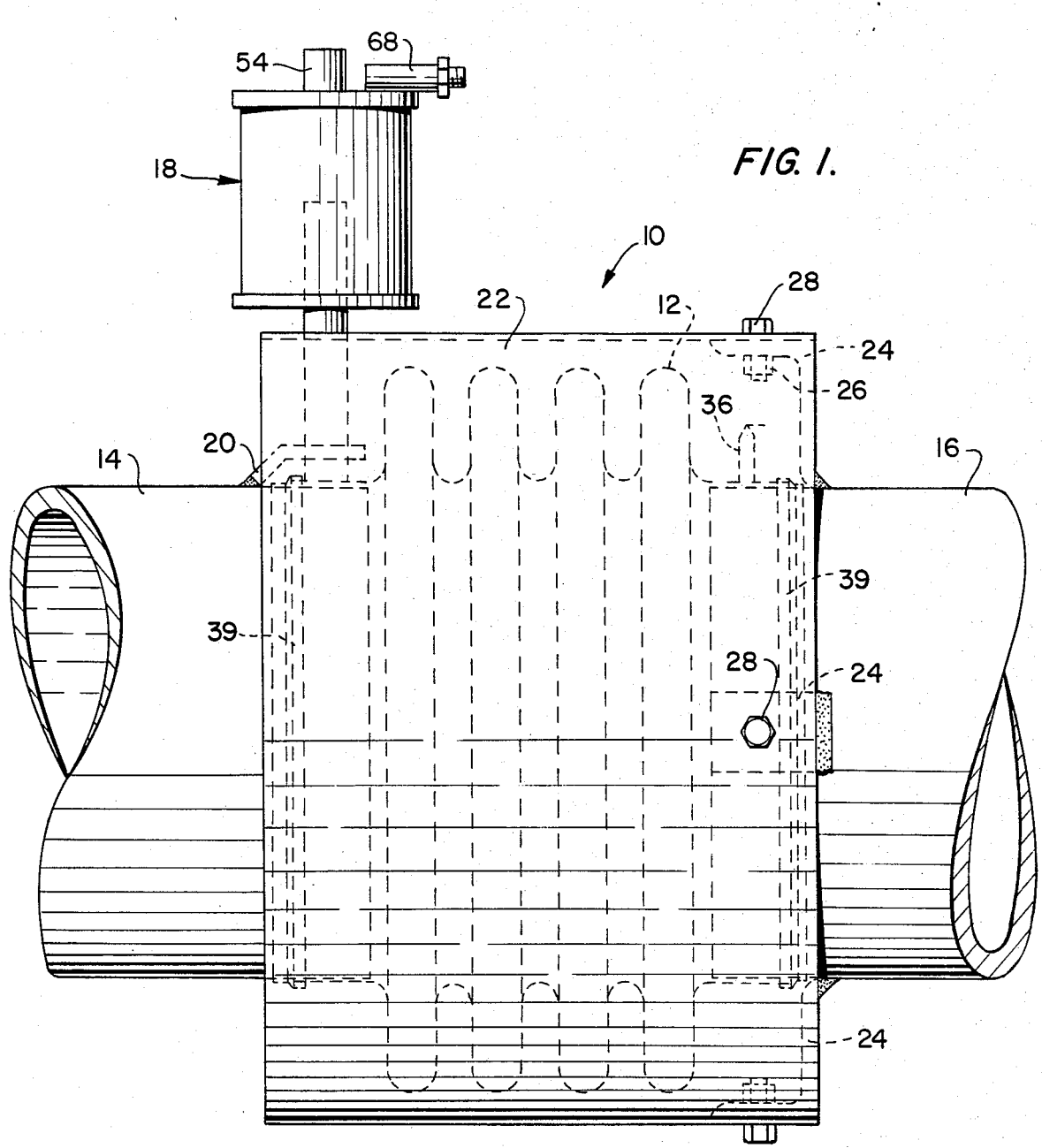
FIG. 1 is a perspective view of the leak indicating conduit according to the present invention.

As can be seen from FIG. 1, the leak indicating conduit according to the present invention, which is designated generally by the reference numeral 10, comprises a corrugated flexible metal conduit 12 in the form of a bellows extending between and connecting two adjacent pipes 14 and 16. The ends of the conduit 12 are welded or otherwise suitably secured to the pipes 14 and 16 in a fluid tight manner. A leak indicating device, generally designated by the reference numeral 18, is connected to the conduit 12 and supported by the pipe 14 through an angle bracket 20. An annular collar 22 encircles the conduit 12 to protect the conduit from impacts and possible ruptures by external forces. The collar 22 is supported on a plurality of circumferentially spaced L-shaped elements 24 welded to the pipe 16, the collar being connected to the L-shaped elements 24 by nuts 26 and bolts 28 or other suitable fasteners.

Figure 3:
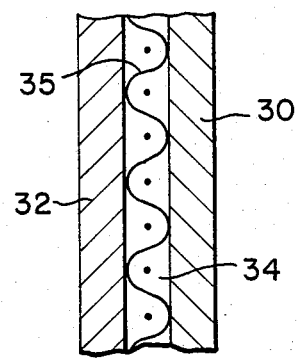
FIG. 3 is an enlarged cross-sectional view of a portion of the leak indicating conduit of FIG. 2.

As can be seen best from FIG. 2, the corrugated flexible metal conduit 12 has a corrugated inner tube 30 and a mating corrugated outer tube 32 coaxial with and spaced from the inner tube by a space 34. The space 34 is placed under a pressure of a predetermined value from the range of values which are either less than or greater than both the pressure of the fluid in the conduit 12 and the ambient pressure. For the embodiment illustrated, the space 34 is under a vacuum, that is, a pressure less than both the pressure of the fluid in the conduit 12 and the ambient pressure, since the illustrated embodiment of the leak indicating device 18 is designed to work for a vacuum. As can be seen from FIG. 3, a device for maintaining the space 34 between the inner tube 30 and the outer tube 32, such as a wire mesh insert 35, may be positioned in the space 34. A piece of tubing 36 or other suitable connector is provided at one end of the conduit 12, in communication with the space 34, so that the vacuum may be applied, and the ends of the conduit 12 are sealed off by welds 38 securing the ends of the conduit 12 to the pipes 14 and 16, thus, totally enclosing the space 34. A tapered ring 39 is positioned over each weld 38 connecting the conduit 12 to the pipes 14 and 16.

The leak indicating device 18 includes an expansible chamber device, such as an expansible corrugated bellows 40, in communication with the space 34 under vacuum. The bellows 40 is contained within a chamber 42 defined by a cylindrical wall 44, a bottom wall 46 having an aperture 47 placing the chamber 42 in communication with the atmosphere, and a top wall 48. An open lower end of the bellows 40 is sealed to the bottom wall 46 around an integral upstanding annular ring 49. The bottom wall 46 is secured to a tube 50 which communicates at one end with the interior of the bellows 40 and at the other end with the space 34. The end of the tube 50 in communication with the space 34 is secured to the outer tube 32 of the conduit 12. A plate 52 defines an upper wall of the bellows 40 which is movable up and down as the bellows 40 expands and contracts. An indicating element 54, such as a short rod or bar, is mounted on the top of a plate 52 so that it moves therewith. The tube 50 extends above the bottom wall 46 into the interior of the bellows 40 to define a seat for the plate 52 in a first, lower position in which the indicating element is concealed within the chamber 42. A radial passage 56 is provided in the tube below the top to provide communication between the bellows 40 and the space 34 when the plate 52 is seated. A biasing device, such as a coiled spring 58, is positioned within the bellows 40 in engagement with the underside of the plate 52, within an integral depending annular ring 60, and in engagement with the upper surface of the bottom wall 46, within the ring 49, to bias the plate 52 and the indicating element 54 upward to a second, indicating position. A central aperture 62 is provided in the top wall 48 so that the indicating element 54 may project therethrough when it is in its upper or second position. The annular collar 22, which protects the conduit 12 from external impacts, includes a notch 64 for receiving the tube 50. An inner sleeve 66 welded to the inside of the pipe 16 extends into the pipe 14 to protect the conduit 12 from the force of flow and pulsations of the fluid carried by the pipes 14 and 16.

In operation, in the normal operating condition, a vacuum is present in the space 34, in the tube 50, and in the bellows 40, thereby pulling the plate 52 and the indicating element 54 down against the bias of the spring 58. In this first, lower, seated position, the indicating element 54 is concealed within the chamber 42. The absence of the indicating element 54 from view is an indication that the vacuum in the space 34 is intact and, thus, that there is no leak in either the inner tube 30 or the outer tube 32 of the conduit 12. Since the vacuum is less than the pressure of the fluid in the conduit 12 and also less than the ambient pressure, if a leak does develop in either the inner tube 30 or the outer tube 32, the vacuum will be lost in the space 34. The vacuum will also be lost in the bellows 40 and, therefore, the plate 52 and the indicating element 54 will be moved by the bias of the spring 58 to their second, upper position in which the indicating element 54 projects above the top wall 48, thereby indicating that a leak is present. For added visibility, the indicating element 54 may be brightly colored in contrast to the structure around it.

The leak indicating device 18 can be used to distinguish a leak in the outer tube 32 from a leak in the inner tube 30. If a leak is present in the outer tube 32 the protruding indicating element 54 will move down under thumb pressure, since the interior of the bellows 40 will be at atmospheric pressure and only the spring 58 holds the indicating element 54 up. However, if the leak is present in the inner tube 30, the pressure of the fluid in the pipes 14 and 16 will fill the bellows 40, so that the indicating element 54 can be forced down only with great effort, if at all.

For an alternate or additional signal, an electrical switch 68 may be provided to make or break a circuit containing an audible or visual alarm or a control device, such as an electrically operated valve controlling the flow of fluid through the conduit. As can best be seen from FIG. 2, in the illustrated embodiment, the switch 68 is mounted on the top wall 48, which includes an opening for receiving an actuator 70 of the switch 68. The actuator 70 protrudes into the chamber 42 in the path of the top plate 52 of the bellows 40. When the top plate 52 is in its first, lower position, it is out of engagement with the actuator 70. However, when the top plate 52 moves to its upper, second position, it engages the actuator 70 and changes the condition of the switch 68, thereby actuating the alarm or control device.

Although the invention as described thus far is effective in indicating leaks in either the inner tube 30 or the outer tube 32, it is just as likely for leaks to occur at the attachment welds 38. Therefore, as can be seen from FIGS. 4 and 5, the annular rings 39 are positioned over the attachment welds 38 and secured by annular welds 68, whereby sealed annular chambers are provided over the attachment welds 38. An aperture 72, such as a notch, is defined at each end of the outer tube 32 to place the annular chambers in communication with the space 34. Thus, if fluid escapes between the inner conduit 30 and either of the pipes 14 or 16, and through the attachment weld 38, it flows through the aperture 72 and into the space 34. Therefore, the escaping fluid destroys the vacuum in the space 34 and triggers the leak indicating device to move to its leak indicating position.

It is understood that the leak indicating device can be modified to respond to pressure, so that the leak indicating conduit 12 can be maintained at a predetermined pressure greater than the pressure of the fluid in the conduit 12 and greater than the ambient pressure. Thus, if a leak develops in the corrugated outer tube 32, the fluid under pressure in the space 34 will flow out, since it is at a pressure greater than the ambient pressure. Similarly, if a leak develops in the corrugated inner tube 30, the fluid under pressure in the space 34 will flow into the conduit 12, since it is at a pressure greater than the pressure of the fluid in the conduit 12.

It is also understood that, although the conduit 12 is shown as an expansion joint where the adjacent pipes 14 and 16 are in alignment, it can also be used as an expansion joint for pipes which lie at an angle with respect to one another. Moreover, various other changes and modifications may be made without departing from the spirit and scope of the present invention as recited in the appended claims and their legal equivalents.

I claim:

1. A leak indicating conduit for connecting adjacent ends of pipes conveying fluid comprising:
    an inner tube;
    an outer tube, the inner tube being separated from the outer tube by a first space under a pressure having a predetermined value;
    means in continuous communication with said first space for indicating a change of pressure in said first space from said predetermined value;
    at least one attachment weld disposed adjacent said conduit and adjacent at least one of said ends of said pipes for attaching said conduit to said at least one of said ends;
    at least one annular ring secured by annular welds to said conduit and said at least one of said ends, such that said at least one attachment weld is enclosed by said at least one annular ring;
    wherein said at least one ring further partially defines a second space adjacent to said at least one attachment weld, said second space being in communication with said first space.

2. The leak indicating conduit of claim 1 wherein the indicating means includes an indicating element movable between a first position in which the indicating element indicates no change of pressure in said space from the predetermined value and a second position in which the indicating element indicates a change of pressure in said space, and means for biasing the indicating element toward the second position.

3. The leak indicating conduit of claim 2 wherein the indicating means further includes an expansible chamber device in communication with said space, the indicating element being mounted on a movable portion of the expansible chamber device.

4. The leak indicating conduit of claim 2 wherein the indicating element is concealed in the first position and visible in the second position.

5. The leak indicating conduit of claim 1 wherein the indicating means includes an expansible chamber device in communication with said space, the expansible chamber device having a movable portion; and
    a switch having an actuator mounted adjacent the movable portion of the expansible chamber device, the movable portion being movable between a first position permitting the switch actuator to maintain a first position for indicating no change of pressure in said space between the inner tube and the outer tube from the predetermined value and a second position requiring the switch actuator to be in a second position for indicating a change of pressure in said space.

6. The leak indicating conduit of claim 3 wherein the expansible chamber device is a bellows.

7. The leak indicating conduit of claim 1 further comprising means in said space for maintaining the inner tube spaced from the outer tube.

8. The leak indicating conduit of claim 7 wherein the maintaining means comprises wire mesh.

9. The leak indicating conduit of claim 1 wherein the leak indicating conduit is a flexible bellows.

10. The leak indicating conduit of claim 9 wherein the leak indicating conduit comprises an expansion joint.

11. An expansion joint according to claim 1, further comprising pipes that comprise said ends of pipes, wherein the indicating means is supported by one of the pipes.

12. The conduit of claim 1 wherein said predetermined value is less than the pressure of the conveyed fluid and the ambient pressure.

13. The conduit of claim 1 wherein said outer tube defines an aperture extending from said first space to said second space, such that said communication is provided.

14. The conduit of claim 1 wherein said conduit is attached to two adjacent ends of two pipes by said enclosed attachment welds.

15. The conduit of claim 1 wherein the ends of said pipes are cylindrical in shape.

16. A method for making a leak indicating expansion joint for adjacent ends of pipes conveying a fluid under pressure, comprising the steps of:
    forming the conduit of claim 1;
    securing said conduit to at least one of the adjacent ends of the pipes with an attachment weld so that said first space is closed at the ends of the bellows and in communication with a second space that encloses said weld;
    placing in communication with said first space said means for indicating a change of pressure in said first space or said second space;
    placing said first and second spaces under a pressure having a predetermined value; and
    sealing said first and second spaces at the predetermined pressure value.

* * * * *